Patented Apr. 8, 1952

2,592,473

UNITED STATES PATENT OFFICE 2,592,473

MODIFICATION OF LINEAR POLYAMIDES WHOSE AMIDE GROUPS ARE SEPARATED BY AT LEAST 4 CARBONS WITH N-CARBO-ANHYDRIDES OF ALPHA AMINO ACIDS

Allan K. Schneider, Wilmington, Del., assignor to E. I. du Pont de Nemours & Company, Wilmington, Del., a corporation of Delaware No Drawing. Application April 21, 1949,
Serial No. 88,899

4 Claims. (Cl. 260—42)

This invention relates to modified polyamides of improved properties.

Synthetic, linear, condensation polyamides containing a plurality of recurring —CONH— units in the polymer chain separated by chains of at least four carbons have been known to the art since the broad pioneering work of Carothers and have developed into commercially important fibers. Despite the large amount of work carried out since these polymers were discovered, only one clean-cut method for the chemical modification of these nylons has been developed, namely, reaction with formaldehyde and an alcohol to give N-alkoxymethyl polyamides.

Various properties of these polyamides are capable of improvement. Thus their dyeing has been a problem. Another property wherein these nylons are subject to improvement is their water sensitivity so as to increase their hydrophilic character and to facilitate finishing treatments such as setting as well as dyeability.

This invention has as an object the improvement of these synthetic, linear, condensation polyamides, the chain of which is composed of —CONH— units separated by chains of at least four carbons, with respect to dyeability. A further object is the improvement in the water sensitivity of these polyamides. Other objects will appear hereinafter.

These objects are accomplished by the present invention wherein a synthetic, linear, condensation polyamide whose recurring —CONH— units are separated by chains of at least four carbons is brought, preferably in film or fiber form, i. e., in a structural form having at least one dimension large in relation to another, into contact with the N-carboanhydride of an alpha-amino acid of from one to seven carbons, preferably carrying on the annular nitrogen a substituent, preferably hydrocarbon, preferably alkyl and of one to seven carbons, under such conditions of temperature and for such a period of time as to cause the reaction of the amino acid N-carboanhydrides with the polyamide, e. g., from room temperature to 160° C. for 15 minutes to 48 hours.

In its simplest practice, this modification reaction is carried out by immersing the preformed nylon polyamide in film or fiber form in a solution of the desired amino acid N-carboanhydride in a solvent, non-reactive with both the polyamide and the N-carboanhydride and preferably a non-solvent for the polyamide, for such a time and at such a temperature that the desired amount of the N-carboanhydride combines with the polyamide, for instance, in a chlorobenzene solution of the N-carboanhydride for 24 hours at reflux. It is believed that what occurs in the main is that the preformed polyamide reacts through its terminal amine hydrogens with the amino acid N-carboanhydride causing scission of the N-carboanhydride ring with carbon dioxide evolution. The polymer chain is lengthened through the resulting combined amino acid units which can in turn react with more amino acid N-carboanhydride, thus leading to the formation of a modified polyamide containing a controlled amount of combined amino acid residues.

The following examples in which parts are by weight are illustrative of the invention.

EXAMPLE I

The polyamide used in this example was prepared by heating at temperatures in the range 285–330° C. essentially equimolar proportions of sebacic acid and the solid mixture (freezing point approximately 40° C.) of geometric isomers of di(p-aminocyclohexyl)methane. This mixture of isomers (diamine) used in preparing the polyamide was made by hydrogenating purified diaminodiphenylmethane at temperatures in the range 200–220° C. under 1500–3000 lb./sq. in. hydrogen pressure in the presence of a catalyst mixture consisting of cobalt oxide, calcium oxide and sodium carbonate as disclosed in O. P. B. Report PB-742 (1941).

Two 0.25 part skein samples of yarn spun from this polyamide are washed at 80° C. in green olive oil soap solution, rinsed, dried and desiccated thoroughly at 100° C. under vacuum and immersed under separate 27.7 part portions of anhydrous chlorobenzene (distilled over phosphorus pentoxide). An equal weight of the N-carboanhydride of sarcosine (N-methylglycine) is added to one of the samples, and both are then heated under reflux for 24 hours. The yarn skeins are removed and heated at 80° C. under vacuum to remove the chlorobenzene and then washed in green olive oil soap solution.

The treated yarn is slightly stiffer, but no evidence is noted of any surface film on the treated sample of yarn upon microscopic examination. The yarn skeins are each divided into four equal portions and a sample of both the treated and the untreated yarn is dyed in each of the following dyes:

Dye I.—A red acid dyestuff powder of Colour Index Number (CIN) 430 having approximately an 80% color content.

*Dye II.*—A blue acid dyestuff powder of CIN 1076 having approximately an 11% color content.

*Dye III.*—A blue direct dyestuff powder of CIN 518 having approximately a 65% color content.

In each case 0.008 part of the respective dye (approximately 10.0–12.5% based on the yarn weight) is mixed with 200 parts of 0.2% acetic acid solution and the yarn sample immersed in the dye bath at 80° C. for thirty minutes. At the end of this time the yarn samples are withdrawn from the dye bath and rinsed three times for a period of five minutes each in a 60° C. water bath. In all three dye-baths, the sarcosine-modified samples of yarn are much more readily wet by the dye solution, swell to a much large extent during the dye cycle, and take up pronouncedly greater amounts of dye than the unmodified control yarn. Particularly brilliant shades are obtained with the Dyes I and II above. In all cases the unmodified yarn controls develop only very faint shades.

EXAMPLE II

A. *Preparation of sarcosine-modified polyhexamethylene adipamide*

Two 1.5 part squares of nylon fabric (the polyamide used is prepared from essentially equimolar portions of hexamethylenediamide and adipic acid stabilized with 1.1 mole per cent acetic acid as disclosed by Peterson in U. S. 2,174,527) are thoroughly washed at 80° C. in green olive oil soap solution for thirty minutes, rinsed, desiccated under vacuum, and immersed in separate 138.5 part portions of anhydrous chlorobenzene (distilled over phosphorus pentoxide). Five-tenths (0.5) part of the N-carboanhydride of sarcosine is added to one flask and the two samples heated under reflux for 24 hours. The fabric samples are removed, dried under high vacuum at 60° C., and then washed in green olive oil soap solution at 80° C. for thirty minutes. Five 0.3 part portions are then prepared from each sample. The treated fabric weighs 0.905 part per unit area whereas the untreated control weighs 0.817 part per unit area, indicating an increase in weight after modification with sarcosine N-carboanhydride of approximately 10%. The fabric is stiffened by the sarcosine modification which is of advantage in certain situations, e. g., when it is desired to decrease the fabric "drape."

B. *Dyeing comparisons*

1. Dye I as identified in column 2.

One of the above 0.3 part samples of treated, i. e., sarcosine-modified, fabric is dyed in 200 parts of a 0.2% acetic acide dye bath containing 0.015 part (approximately 5% based on the weight of the fabric) of Dye I at 90° C. for 24 minutes. A like sample of the untreated, control fabric is dyed in a 200 part 0.2% actic acid dye bath containing 0.030 gram (approximately 10% based on the weight of the fabric) of the same dye at 90° C. for 35 minutes. Under these conditions, i. e., using a dye bath twice as strong for a 40% longer time approximately equivalent dye levels are obtained on the treated and untreated samples. Both samples are a deep, brilliant red in color. After washing both samples for 30 minutes at 80° C. in green olive oil soap solution, it is noted that the treated sample is less wash-fast than the control. However, on re-dyeing, the treated sample absorbs dye much more rapidly than the untreated control, indicating that substantially all the modifying agent is still present. Upon exposure of both the treated and untreated, dyed samples in a Fade-Ometer for periods of 25, 50, 75, and 100 hours, no marked difference in behavior is noticed. However, the treated sample appears to be somewhat more light-fast.

2. Dye II as identified in column 3.

Another 0.3 part sample of the treated, i. e., sarcosine-modified, fabric is dyed for 25 minutes at 90° C. in a 200 part 0.2% acetic acid dye bath containing 5 parts (approximately 3.3% of dye based on the weight of the fabric) of a 0.2% water solution of Dye II. Another like sample of the untreated, control fabric is dyed in a similar bath containing 15 parts (approximately 10% of dye based on the weight of the fabric) of the same dye solution. Under these conditions, i. e., using with the untreated sample a dye bath three times as strong as the bath used with the treated sample approximately the same color levels are obtained on both the treated and untreated samples. Both are a brilliant deep blue. After washing both samples for 30 minutes at 80° C. in green olive oil soap solution, it is noted that the treated sample is less wash-fast than the control. However, on re-dyeing, the treated sample absorbs dye much more rapidly than the untreated control, indicating that substantially all the modifying agent is still present. Upon exposure of both the treated and untreated dyed samples in a Fade-Ometer for periods of 25, 50, 75 and 100 hours, no marked difference in behavior is noticed. However, the treated sample appears to be somewhat more light-fast.

Microscopic examination of cross-sections cut from fibers obtained from the sarcosine-modified nylon fabric dyed with Dye II show no heavy concentration of dye on the surface as would have been expected if the sarcosine polymer were present solely as a surface coating. There is thus good indication that the sarcosine modification is distributed throughout the body of the polyamide fibers.

3. *Dye IV.*—A green vat dyestuff paste of CIN 1101 having approximately an 11% color content.

Another 0.3 part sample of the untreated control fabric is dyed in a reducing dye bath containing 5 parts of water, 0.3 part of 3% sodium hydroxide solution, 0.2 part of 10% sodium bisulfite solution, 15 parts of water, 0.5 parts of sodium sulfate and 0.06 part of Dye IV (approximately 20% based on the weight of the fabric) at 50° C. for 45 minutes. At the end of this time the fabric is removed and exposed to the air thus oxidizing the absorbed leuco-vat dye to the insoluble vat form. Another like sample of the treated, i. e., sarcosine-modified, fabric is dyed in a dye bath containing the same ingredients in the same proportions as given above except that only 0.03 part (approximately 10% based on the weight of the fabric sample) of Dye IV is used. Under these conditions, i. e., using with the untreated sample a dye bath containing twice as much dye as the bath used with the treated sample the untreated control is dyed to approximately the same level as the treated sample. However, the treated sample is still somewhat darker. Both fabrics are medium blue-green in shade. Essentially no change in color is observed on washing both samples in green olive oil soap solution for 30 minutes at 80° C. followed by two rinses in water at 60° C. Upon exposure of both samples in a Fade-Ometer for periods of 25, 50, 75 and 100 hours no great difference is observed between the treated and untreated samples. Both become slightly dull after 25 hours' exposure and show no sharp break in color even after 100 hours' exposure.

4. *Dye V.*—A red vat dyestuff powder of CIN 1162 having approximately an 18.5% color content.

Another 0.3 part sample of the untreated control is dyed in a reducing dye bath containing 25 parts of 0.6% sodium hydroxide solution, 0.05 part of sodium formaldehyde-sulfoxylate ("Sulfoxite C") and 0.037 part (approximately 12% based on the weight of the fabric) of Dye V at 90-95° C. for 45 minutes. At the end of this time the dyed fabric is immersed in a 0.5% sodium bichromate bath containing 1% acetic acid at 40° C. to oxidize the absorbed leuco-dye to the insoluble vat form. Another like sample of the treated, i. e., sarcosine-modified, fabric is dyed in a dye bath containing the above given substituents in the same proportions and under the same conditions except that only 0.018 part (approximately 6% based on the weight of the fabric) of dye is present. Under these conditions, i. e., utilizing a dye bath containing twice as much dye, the untreated, control sample still is not dyed as deep a shade as the treated fabric. Both are dark pink in color. No change in color is noted after washing both samples in a green olive oil soap solution at 80° C. for 30 minutes followed by two rinses in water at 60° C.

Upon exposure of both samples in a Fade-Ometer for periods of 25, 50, 75 and 100 hours, a marked difference in behavior is noted. After 25 hours' exposure, the dyed, untreated, control sample exhibits a marked break in color and on continued exposure in step-wise degrees becomes yellow. The dyed, treated (i. e., sarcosine-modified) sample after 25 hours' exposure exhibits only slight fading but no real change in color and very little, if any, subsequent degradation is noted upon further exposure. Thus, at the end of 100 hours' exposure the dyed, treated, i. e., sarcosine-modified, sample, though faded, still maintains its red color as contrasted to the yellowish tan color developed by the dyed, untreated control.

EXAMPLE III

A. *Preparation of glycine-modified polyhexamethylene adipamide*

A 2.49 part piece of nylon fabric (the polyamide used is prepared as described previously in Example II) is placed in a mixture of 30 parts of ethyl acetate, 0.4 part of water and 1.0 part of the N-carboanhydride of glycine [prepared as described by Go and Tani, Bull., Chem. Soc., Japan 14, 510 (1939)] in a flask fitted with a reflux condenser. The nylon fabric is thus treated in fiber form with glycine-N-carboanhydride in twelve times its weight of ethyl acetate containing 1.3% water. The mixture is heated in a water bath at 50° C. for 5.5 hours with occasional shaking. The heating can be varied within the range 5 to 6 hours without excessive variation from the result obtained in 5.5 hours. The fabric sample is removed, rinsed in water, then in green olive oil soap solution, rinsed again in water and finally carefully dried. The treated fabric now weighs 2.772 parts, i. e., an increase in weight of 0.282 part or approximately 11%.

B. *Dyeing comparisons*

The above-treated nylon fabric and a similar control (i. e., a like sample of the original nylon fabric carefully washed and dried) are dyed in the same dye bath containing 20 parts of a 0.2% water solution of purified Dye VI—a red acid dyestuff powder of CIN 31 having approximately a 50% color content containing one part of 5% acetic acid solution at 98° C. for 4 hours. At the end of this time, both samples are removed from the dye bath, rinsed with water, washed with green olive oil soap, rinsed and carefully dried. A 0.050 part sample of each piece of dyed fabric is taken and dissolved in thirty parts of purified, freshly distilled o-chlorophenol. The per cent transmission of both these solutions is then measured on a Beckman spectrophotometer at the wave length of light previously determined as the maximum absorption region for the specific dye being used. Through a predetermined per cent transmission vs. weight of purified dye plot, the weight per cent of purified dye absorbed on each sample is determined. The results for the untreated control indicate an absorption of 0.77% dye and for the glycine aftertreated polyhexamethylene adipamide fabric an absorption of 1.07% purified dye. Thus, these results clearly indicate 40% increase in the dye absorption for the glycine N-carboanhydride aftertreated polyhexamethylene adipamide fabric over that of the untreated control of the above-identified, purified, representative acid dye.

In the process of this invention there can be employed for the modification of synthetic linear condensation polyamides containing a plurality of recurring —CONH— units in the polymer chain separated by chains of at least four carbons, the N-carboanhydrides of one or more alpha-amino-mono-carboxylic acids, carrying at least one hydrogen on the amino nitrogen, which acids less their nitrogen substituents, if any, are of no more than seven carbons and whose nitrogen substituents, if any, are also of no more than seven carbons, i. e., N-carboanhydrides of the formula:

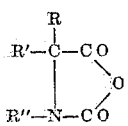

wherein R'' is hydrogen or an organic radical of one to seven carbons and R and R' are hydrogen or organic radicals and together cannot contain more than five carbon atoms.

The N-carboanhydrides of alpha-mono-amino-mono-carboxylic acids which, less the nitrogen substituent, if any, contain more than seven carbons, i. e., whose acid skeleton is of more than seven carbons, or which have more than seven carbons in the substituent, if any, on the amino nitrogen have no utility in the process of this invention since they do not contribute water sensitivity to the polymers treated therewith. In fact, in many instances wherein the number of carbons in either or both of the two above-mentioned portions of the molecule are appreciably more than seven, the polymers aftertreated therewith actually become less water sensitive, more waterproof, and of lower dyeability, especially from aqueous systems.

Among the N-carboanhydrides of aliphatic, aromatic, cycloaliphatic, and heterocyclic, alpha-aminocarboxylic acids, operable in the process of this invention for reasons of greater availability and ease of reaction in the modification procedure, it is preferred to use the N-carboanhydrides of aliphatic and cycloaliphatic (i. e., aliphatic in character; i. e., non-aromatic) alpha-amino acids of two to seven carbon carrying, if desired, alkyl, aralkyl, alkaryl, or cycloaliphatic nitrogen substituents of one to seven carbons wherein the substituents on the N-carboanhydride ring are solely hydrocarbons, i. e., 2,5-oxazolidinediones having hydrogen or a monovalent alkyl, aryl, alkaryl, aralkyl, or cycloalkyl hydrocarbon radical of no more than seven carbons on the annular nitrogen and having as substituents, if any, on the 4 carbon (i. e., the alpha carbon of the alpha-amino acid) monovalent hydrocarbon radicals, hydrogen not being considered a substituent and the total carbons in the said substituents being not more than five.

For reasons of the improved water sensitivity and dyeability engendered in the aftertreated polyamides, those N-carboanhydrides of the above formula, wherein R'' is solely hydrocarbon of not more than seven carbons and together R and R' total not more than five carbons, i. e., N-carboanhydrides of N-hydrocarbon substituted C-lower alkylglycines are preferred. Thus N-carboanhydrides, of alpha-amino alkanoic acids, where the alkanoic acids are of 2 to 7 carbons are preferred. In these acids an alkylidine radical of one to six carbons has its valences satisfied by an amino group having hydrogen on the nitrogen and by a carboxyl group. The outstanding among these due to their ease of preparation and greater reactivity with the preformed linear, condensation polyamides to be modified—are those N-carboanhydrides of the above type formula wherein R and R' are both hydrogen and R'' is solely hydrocarbon of not more than seven carbons, i. e., the N-carboanhydrides of N-hydrocarbon-substituted-glycines. The most outstanding of these, due not only to their ease of preparation and greater reactivity with the preformed long chain polyamides to be modified, but also due to the especially improved water sensitivity and dyeability conferred on the resulting modified polyamides, are those N-carboanhydrides of the above type formula, wherein R and R' are both hydrogen and R'' is lower alkyl (an alkyl radical containing from one to four carbons), i. e., the N-carboanhydrides of N-lower alkyl-substituted-glycines.

As specific examples, of the alpha-amino acids whose N-carboanhydrides can be used in the process of this invention, there may be mentioned alpha-primary-amino alkanoic acids, e. g., alanine, leucine, isoleucine, alpha-amino-n-butyric acid, alpha-methyl-alpha-amino-n-butyric acid, glycine, alpha-aminoisobutyric acid; cycloaliphatic alpha-primary-aminocarboxylic acids, e. g., 1-aminocyclopentanecarboxylic acid, 1-aminocyclohexanecarboxylic acid; N-alkyl-substituted-aliphatic alpha-amino acids, e. g., N-methylglycine, N - isopropylglycine, N - methylalanine, N-isopropylleucine, N - methyl-alpha-aminoisobutyric acid; N-aryl-substituted-alpha-amino acids, e. g., N-p-tolylglycine, N-phenylglycine.

The modification of the nylon polyamides can be carried to any desired point, i. e., any amount of combined amino acid residues may be introduced into the polyamide to be modified depending upon the degree of protein-like character it is desired to impart in the case of the N-carboanhydrides of the primary alpha-amino acids and upon the degree of water sensitivity and dyeability desired in the case of the N-carboanhydrides of N-substituted alpha-amino acids. However, for retention to a major degree of the outstanding fiber and film properties of the nylons being modified, it is necessary that the final modified product contain compositionally a major proportion, i. e., greater than 50% by weight, of the original nylon polyamide being modified. Expressed another way this means that the final modified product corresponds compositionally to one containing up to 50% combined alpha-amino acid residues.

However, improvements in water sensitivity and dyeability of the order of magnitude necessary to make the nylon-type polyamides compare favorably in these respects to the natural fibers can be engendered with relatively minor amounts of N-substituted alpha-amino acid residues in the end products, and similarly for the protein-like character of the end product in the case of the combined primary alpha-amino acid residues. Furthermore, such compositions maintain to the highest extent the outstanding physical properties of the unmodified nylons. Accordingly, it is desirable to carry out the modification under such conditions of temperature, time, concentration of amino acid N-carboanhydride, that only minor amounts, of the order of 5 to 25%, or lower, based on the final modified compositions, of combined alpha-amino acid residues are introduced into the polyamide.

The nylon-type polyamides can be modified with alpha-amino acid N-carboanhydrides by carrying out the modification reaction in solution. The modification may also be accomplished, especially if it is desired to prepare an only slightly modified nylon, i. e., one containing from 1-5% (based on the weight of the end composition) combined amino acid residues, by immersion of the polyamide, preferably in thin film or fiber form, in a heated solution of the amino acid N-carboanhydride preferably in a non-solvent or swelling agent for the polymer for a short time. For instance, the polymer may be immersed in a chlorobenzene solution of the amino acid N-carboanhydride for one to six hours at 65–100° C.

The nylon may also be modified by mixing the preformed nylon polyamide, preferably in relatively finely divided form, with the required amino acid N-carboanhydride, and heating the resultant dry mixture until the desired modification takes place, for instance, 15 minutes to 4 hours at 65–160° C. Modification may also be carried out (again especially if it is desired to prepare an only slightly modified polyamide) by immersing the polyamide, preferably in thin film or fiber form, directly in the required amino acid N-carboanhydride in molten form for a short time and maintaining the polyamide in the molten N-carboanhydride until the desired degree of modification has occurred. To prevent the polymerization of the amino acid N-carboanhydride before the polyamide to be modified is added, it is preferred to carry out the melting of the N-carboanhydride just prior to, or at the time of, the introduction of the said polyamide.

The modification of the polyamides, whether powdered, granulated, in film or fiber form or in solution, with the N-carboanhydrides can be carried out at temperatures ranging from room temperature to 150° C. or higher. Thus temperatures of 25–160° C. may be employed and the heating continued for from 15 minutes to 24 or even 48 hours. It is preferred to carry out the modification reaction at temperatures in the range 25–30° C. above and below the melting point of the N-carboanhydride involved, i. e., in most cases in the range of about 70 to about 130° C. It is convenient to carry out the modification reaction at the reflux temperature of the solvent if one is being used. Suitable solvents which will dissolve the N-carboanhydrides and in some instances exhibit some swelling action for the polyamide include, for example, halogenated hydrocarbons, e. g., chloroform, carbon tetrachloride, tetrachloroethane, chlorobenzene, bromobenzene; aromatic hydrocarbons, e. g., benzene, toluene, the xylenes, etc.

The concentration of the alpha-amino acid N-carbonhydride in the modifying solution is governed solely by the solubility of the N-carboanhydride involved in the solvent being used. However, it is usually beneficial to operate at concentrations no higher than that at which the resulting solution is fluid enough to insure complete mixing of the polyamide with the solution.

The alpha-amino acid N-carboanhydride may be applied to the preformed nylon-type polyamide by any suitable means, examples of which have been given previously, wherein the added amino acid N-carboanhydride is maintained in contact with the polyamide to be modified for a sufficient time at such a temperature that the N-carboanhydride reacts. For all practical purposes since all alpha-amino acid N-carboanhydrides known to us are solids, it is most convenient and, therefore, accordingly preferred to dissolve the desired amount (calculated on the basis of the percent combined amino acid residues it is desired to incorporate into the end product) of the alpha-amino acid N-carboanhydride involved in a suitable liquid, which preferably is also a nonsolvent and may be a swelling agent for the polyamide, non-reactive with both the N-carboanhydride and the polyamide to be modified, and to maintain the reaction mixture at such a temperature and for such a period of time that the alpha-amino acid N-carboanhydride all reacts, for instance, using chlorobenzene as the solvent, for 24 hours at reflux. It is not necessary, however, as previously mentioned, in those instances where only a small amount of modification is desired that all the amino acid N-carboanhydride present be reacted. This is especially true in those instances where the modification reaction is carried out on preformed, thin films or fibers.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for improving the dye receptivity of linear polyamides with recurring intralinear —CONH— groups which are separated by carbon chains of at least four carbons which comprises heating the same at 50° C. in fiber form in 12 times its weight of ethyl acetate containing 1.3% water for 5 to 6 hours with glycine-N-carboanhydride.

2. A process for improving the dye receptivity of linear polyamides with recurring intralinear —CONH— groups which are separated by carbon chains of at least four carbons which comprises heating the same in a structural form having one dimension large relative to at least one other at 25–160° C. for 15 minutes to 24 hours with glycine-N-carboanhydride.

3. A process for improving the dye receptivity of linear polyamides with recurring intralinear —CONH— groups which are separated by carbon chains of at least four carbons which comprises heating the same in a structural form having one dimension large relative to at least one other at 25–160° C. for 15 minutes to 24 hours with the N-carboanhydride of an alpha-amino alkanoic acid hydrocarbon except for the amino nitrogen, hydrogen thereon, and the carboxyl, wherein the alkanoic acid is of two to seven carbons, the amino group contains hydrogen on the amino nitrogen, and the amino alkanoic acid contains in the amino group not more than seven carbons.

4. A process for improving the dye receptivity of linear polyamides with recurring intralinear —CONH— groups which are separated by carbon chains of at least four carbons which comprises heating the same in a structural form having one dimension large relative to at least one other at 25–160° C. for 15 minutes to 48 hours with an N-carboanhydride of the formula

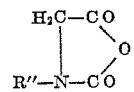

wherein R″ is a member of the class consisting of hydrogen and monovalent hydrocarbon radicals of not more than seven carbons.

ALLAN K. SCHNEIDER.

REFERENCES CITED

The following references are of record in the file of this patent:

UNITED STATES PATENTS

| Number | Name | Date |
|---|---|---|
| 2,327,162 | Baldwin et al. | Aug. 17, 1943 |

FOREIGN PATENTS

| Number | Country | Date |
|---|---|---|
| 567,501 | Great Britain | Feb. 16, 1945 |

OTHER REFERENCES

Matthews' Textile Fibers (5th edition—John Wiley & Sons), page 868. Copy in Division 43.